Oct. 5, 1965   R. T. MARTIN ETAL   3,210,483
AUDITORY DEVICE
Filed April 13, 1962
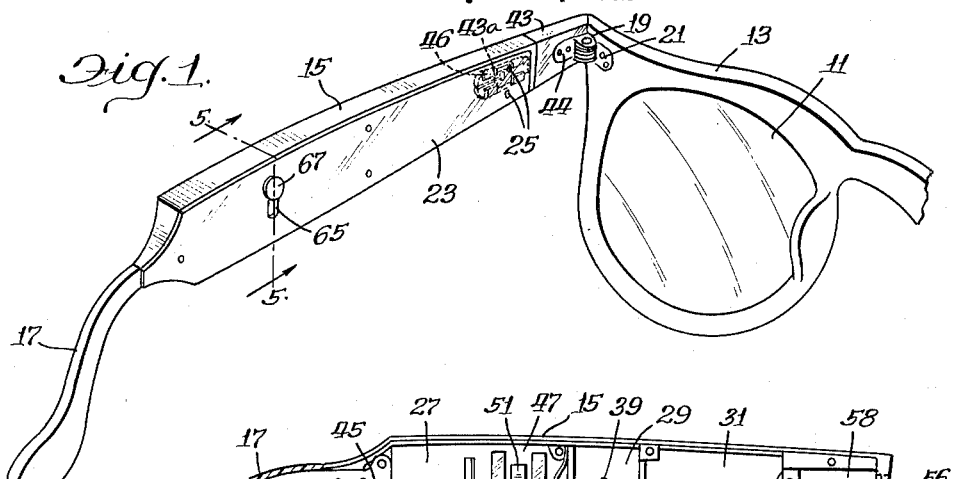
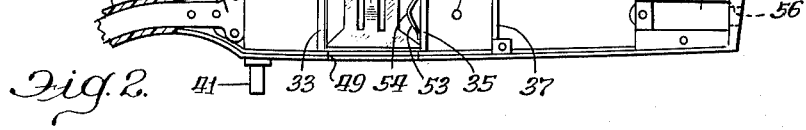
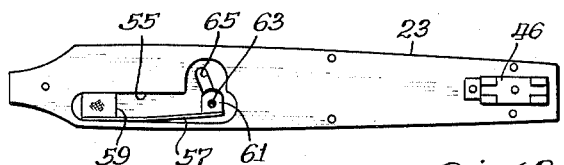
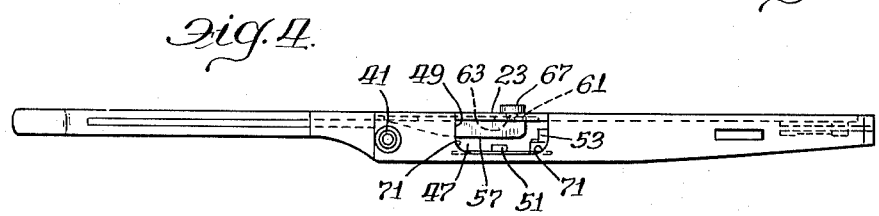
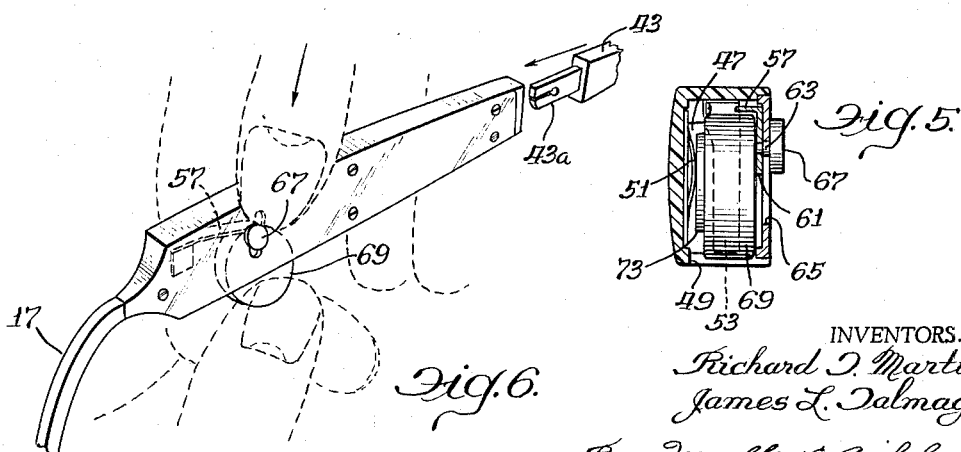
INVENTORS.
Richard T. Martin
James L. Talmage
By Mueller & Aichele Attys

United States Patent Office 3,210,483
Patented Oct. 5, 1965

3,210,483
AUDITORY DEVICE
Richard T. Martin and James L. Talmage, Minneapolis, Minn., assignors to The Dahlberg Company, Minneapolis, Minn., a corporation of Minnesota
Filed Apr. 13, 1962, Ser. No. 187,427
2 Claims. (Cl. 179—107)

This invention relates to hearing aids and more particularly to an improved battery compartment for a hearing aid contained in one of the temple pieces of a pair of eyeglasses.

Those persons afflicted with impaired hearing generally desire that the size of hearing aid devices be reduced as much as possible. By making the hearing aid inconspicuous, the user may be less self-conscious about his difficulty and receive a resultant psychological benefit. With the introduction of transistors and similar microelectronic elements it has become possible to reduce the size of hearing aids to the point where they may be completely contained in one of the temple pieces of a pair of eyeglasses.

Although small batteries have been developed for supplying power to such hearing aids, they must, as with most batteries, be removed at times for replacement. It is also desirable to be able to quickly and easily remove the battery when the hearing aid is not in use to prevent a drainage of power therefrom it there is no other switch for the device. Curbersome mechanisms to facilitate removal of the battery from the hearing aid must be avoided because of the necessity to maintain the hearing aid in a light-weight compact unit.

Accordingly, it is an object of this invention to provide an improved battetry holder for a hearing aid contained in the temple piece of a pair of eyeglasses, from which the battery may be readily removed.

Another object of the invention is to provide a light-weight compact battery ejection mechanism for a hearing aid contained in the temple piece of a pair of eyeglasses.

A feature of the invention is the provision of a battery compartment with a resilient arm having a fixed end and a manually displaceable free end to eject the battery contained in the compartment.

Still another feature of the invention is the provision, in the temple piece of a pair of eyeglasses containing a battery powered hearing aid, of a battery compartment having an opening keyed to the shape of the battery to insure alignment of the battery with proper polarity.

In the drawing:

FIG. 1 is a perspective view of a portion of a pair of eyeglasses, a temple piece which is constructed in accordance with the invention;

FIG. 2 is a side elevation of the temple piece of FIG. 1 with the cover plate removed;

FIG. 3 is an inverted side elevation of the cover plate as removed from the temple piece of FIG. 2;

FIG. 4 is a bottom view of the temple piece;

FIG. 5 is a sectional view of the temple piece taken along the line 5—5 of FIG. 1 and showing a battery in place; and FIG. 6 is a perspective view illustrating the operation of the ejection mechanism of the invention.

Briefly the invention includes a pair of eyeglasses having a temple piece assembly containing a hearing aid. A compartment is provided in the temple piece assembly for retaining a battery for supplying power to the hearing aid. The battery is retained in the compartment by resilient contacts, and may be inserted through a keyed opening to insure polarity, with no portion of the battery remaining outside the compartment. An elongated resilient arm is mounted along the side of the compartment opposite the opening and is fixed at one end to the temple piece assembly. When the resilient arm is flexed, it contacts the battery forcing it fully or partially out of the compartment so that it may be gripped easily by the user. A slot is provided in a side of the temple piece assembly and opens into the compartment. An actuating member extends through the slot and is manually operable to flex the resilient arm.

Referring now to FIG. 1, one-half of a pair of eyeglasses is shown and it is to be understood that the other half is of similar configuration. It should also be understood that one or both of the temple pieces of the eyeglasses may contain a hearing aid. Lens 11 is contained in a frame 13 and a temple piece 15, which extends along the head of the user adjacent his temples, is fastened to frame 13. Temple piece 15 has earpiece 17 extending therefrom to fit behind the user's ear and further secure the eyeglasses in place. Alternatively earpiece 17 may be formed to fit contour of head behind the ear. Temple piece 15 is fastened to frame 13 by means of a hinge 19 and hinge plate 21. The inside face of temple piece 15 has a cover plate 23 secured thereto by screws 25.

As may be seen in FIG. 2, temple piece 15 is hollow and contains chambers 27, 29 and 31 which are separated by panels 33, 35 and 37. Chamber 29 may contain a microphone which is exposed to outside sound through opening 39 in temple piece 15. Chamber 31 may contain the amplifier consisting of transistors, resistors, capacitors, etc., for amplifying the signals received by the microphone in chamber 29, and chamber 27 may contain means for converting these amplified signals into sound which emanates through sound tube coupler 41 mounted in temple piece 15. Temple tip 43 is secured to one end of temple piece 15 and has hinge plate 44 fastened thereto. Temple tip 43 is secured to temple piece 15 by inserting tongue portion 43a into retainer 46 on cover plate 23. (See FIGS. 3 and 6.) Mounting means 45 are provided at the opposite end of temple piece 15 for securing earpiece 17 thereto.

A fourth chamber 47 is provided in temple piece 15 between panels 33 and 35. An opening 49 is left in the bottom of temple piece 15 so that chamber 47 and opening 49 form, in effect, a battery compartment. This compartment is for containing a battery to power the hearing aid and is provided with resilient means 51 and 53 which form the negative and positive contacts, respectively, for the battery. A fifth chamber 58 is formed at one end of temple piece 15 to contain retainer 46, and an access opening 56 is provided therefor.

Referring now to FIG. 3, cover plate 23 is shown inverted as it appears when removed from temple piece 15. A recess 55 is formed in the surface of cover plate 23 and a thin light-weight elongated resilient arm 57 having a perpendicular flanged portion 59 is secured to cover plate 23 in recess 55 by flanged portion 59. When cover plate 23 is mounted on the temple piece 15, arm 57 lies along the side of chamber 47 opposite opening 49. The opposite end of arm 57 has formed thereon a second flanged portion 61 which has a pin 63 mounted therein. Pin 63 extends through a slightly arcuate slot 65 formed in mounting plate 23, and has a disc 67 at its other end. As may be seen in FIG. 4, disc 67 and flanged portion 61 are of dimensions greater than the width of slot 65. Thus, slot 65 allows free movement of pin 63 and disc 67 which moves in a slightly arcuate path to displace resilient arm 57.

Referring now to FIG. 5, the positioning of the battery 69 may be seen. Battery 69 has a raised portion 73 on one surface thereof, extending outwardly of the main body portion of the battery. Raised portion 73 is insulated from the main body portion of battery 69, and forms the negative terminal for the battery. The main body portion of battery 69 forms the positive terminal. Battery 69 fits completely in chamber 47 through opening 49 and is held therein by resilient clips 51 and 53 (see FIG. 2). Resilient clip 53 is mounted on panel 35 and has a raised contact portion 54 extending inwardly at a distance from the side of chamber 47 opposite opening 49 slightly greater than the radius of battery 69. When the battery is fully inserted into chamber 47, portion 54 of clip 53 will wedge battery 69 against panel 33 and the side of chamber 47 opposite opening 49 to secure the battery in place. These clips also form the contacts for the positive and negative terminals of the battery 69, and may have electrical conductors connecting them to various elements of the hearing aid contained in chambers 27, 29 and 31.

As may be seen from FIG. 5, when disc 67 is moved in the direction of the arrow, pin 63 will slide along a slightly arcuate path in slot 65 and carry flanged portion 61 with it. This flexes arm 57 into contact with battery 69, forcing it out of chamber 47. As depicted in FIG. 6, disc 67 may be conveniently moved until resilient arm 57 forces battery 69 through opening 49 sufficiently to permit the battery to be gripped manually by the user. Once this is done, battery 69 may be easily drawn forth from recess 47. Resilient arm 57 then returns the disc 67 to its original position. The simplicity of this arrangement, as described, provides a simple but effective ejection mechanism which may be constructed of a minimum quantity of light materials, conserving space and weight.

Returning now to FIG. 4, it may be seen that opening 49 has radii 71 formed in two of its four corners. Since battery 69 (see FIG. 5) contains raised portion 73 on one surface thereof, radii 71 will not interfere with the insertion of battery 69 through opening 49 when raised portion 73 faces away from that side of opening 49 adjacent cover plate 23. However, when an attempt is made to insert battery 69 with raised portion 73 facing the side of opening 49 adjacent cover plate 23, radii 71 will engage the main body of battery 69 to interfere therewith. Thus, opening 49 is keyed to the shape of the battery to remind the user of the correct alignment of battery 69. This insures correct positioning of battery 69 in chamber 47 with resilient means 51 engaging raised portion 73 and resilient means 53 engaging the main body portion of battery 69 for proper polarity.

As will be apparent from the foregoing discussion, the invention provides an improved low cost battery holder for a hearing aid contained in the temple piece of a pair of eyeglasses, which holder contains a light-weight compact battery ejection mechanism which enables the battery to be readily removed from the holder.

We claim:

1. A pair of eyeglasses adapted to contain a hearing aid for receiving and amplifying audible sound and conveying it to the ear of the wearer, including in combination, a temple piece including a cover plate along a side thereof, said temple piece having a hollow interior portion for containing the hearing aid, a compartment formed in said temple piece for containing an energy source for powering the hearing aid, electrical contact means in said compartment for engaging the energy source, said temple piece further having an opening therein to permit insertion of the energy source into said compartment, an elongated resilient arm mounted in said compartment along a side opposite said opening and having an end fixed to said cover plate of said temple piece, said resilient arm being displaceable to urge the energy source from said compartment, an elongated slot formed in said temple piece and opening into said compartment, and actuating means fixed to said resilient arm and extending through said slot for manually displacing said resilient arm, whereby the energy source may be readily removed from said compartment.

2. A pair of eyeglasses adapted to contain a hearing aid for receiving and amplifying audible sound and conveying it to the wearer's ear, including in combination, a pair of temple pieces one of which includes a metal cover plate along a side thereof, and which has a plurality of hollow interior chambers for containing elements of the hearing aid, one of said chambers comprising a compartment for containing a battery of nonsymmetrical cross section for powering the hearing aid, a pair of resilient clips providing electrical contact between the hearing aid and the respective poles of the battery and for holding the battery in place, said temple piece further having an opening through which the battery may be inserted into said compartment, said opening being formed of a configuration keyed to the nonsymmetrical cross section of the battery to permit passage of the battery only when the battery is aligned with said resilient clips in proper polarity, an elongated resilient arm mounted in said compartment along a side opposite said opening and having a first flanged end fixed to said cover plate of said temple piece, said resilient arm further having a second flanged end and being displaceable to cause said second flanged end to engage the battery and urge same out of said compartment, an elongated arcuate slot formed in said temple piece and opening into said compartment, and actuating means fixed to the free end of said resilient arm and extending through said slot to permit manual displacement of said resilient arm to eject the battery from said compartment.

References Cited by the Examiner

UNITED STATES PATENTS

| | | | |
|---|---|---|---|
| 2,523,354 | 9/50 | Butler | 179—107 |
| 2,894,076 | 7/59 | Posen | 179—107 |
| 2,909,619 | 10/59 | Hollingsworth | 179—107 |
| 2,938,083 | 5/60 | Hermann | 179—107 |

ROBERT H. ROSE, *Primary Examiner.*